Dec. 8, 1936.   A. D. GULLIVER   2,063,244
EFFICIENCY INDICATING MECHANISM FOR BRAKES
Filed Dec. 5, 1929   2 Sheets-Sheet 1
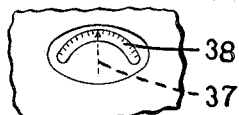
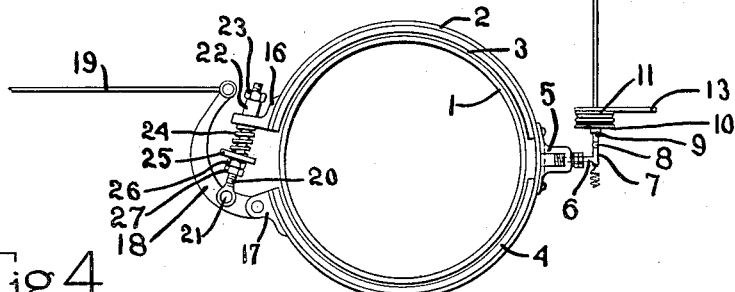
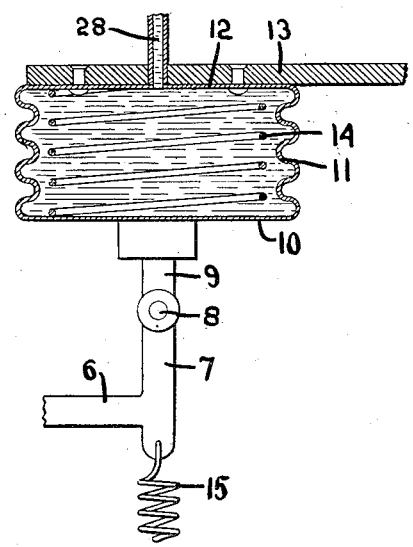
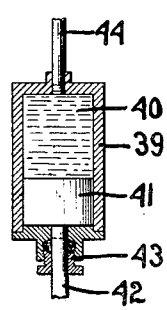
Inventor:
Archibald D. Gulliver
by Heard Smith & Tennant
Attys.

Dec. 8, 1936.  A. D. GULLIVER  2,063,244
EFFICIENCY INDICATING MECHANISM FOR BRAKES
Filed Dec. 5, 1929  2 Sheets-Sheet 2
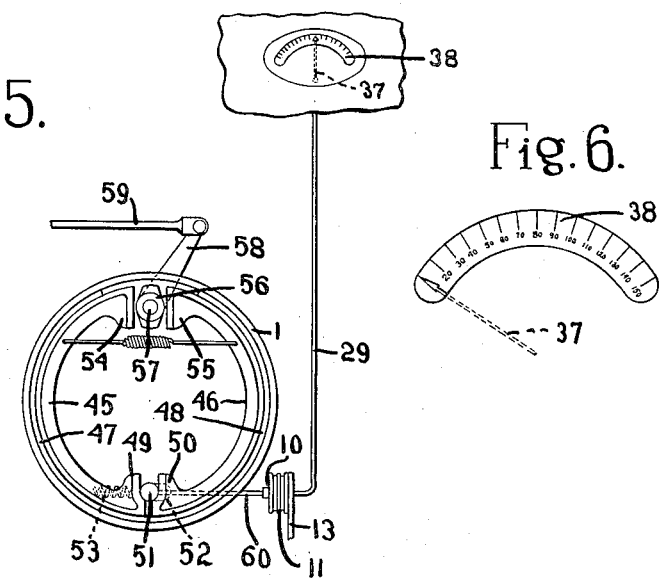
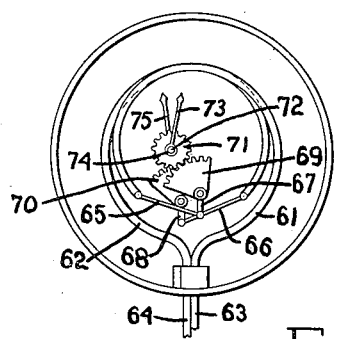
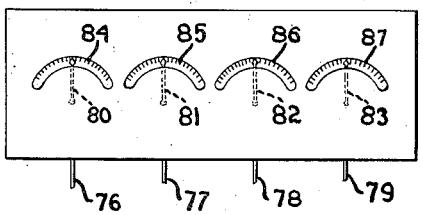
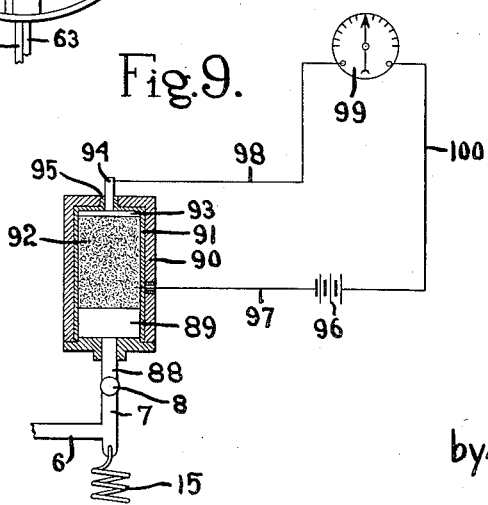
Inventor.
Archibald D. Gulliver
by Heard Smith & Tennant
Attys.

Patented Dec. 8, 1936

2,063,244

UNITED STATES PATENT OFFICE 2,063,244

EFFICIENCY INDICATING MECHANISM FOR BRAKES

Archibald D. Gulliver, Fitchburg, Mass.

Application December 5, 1929, Serial No. 411,781

12 Claims. (Cl. 265—47)

This invention relates to efficiency indicating mechanisms for brakes and the principal object of the invention is to provide mechanism operable by the existing force of resistance to a rotatable brake member to measure and indicate the force of such resistance during the rotation of the rotatable braking member.

More particularly the invention relates to braking mechanisms for vehicles and the object thereof is to provide means including a device, located within the field of vision of the driver of the vehicle, for measuring and indicating the force of frictional resistance of an applied brake or brakes.

A further and important object of the invention is to provide a device of the character above described which will indicate with substantial accuracy the approximate distance within which the applied brakes will stop the vehicle.

A further object of the invention is to provide braking mechanism for vehicles having a plurality of brakes with indicating means of the character above described which will show the relatively frictional resistance of the respective brakes at all times, thereby advising the operator whether any of the brakes are dragging, and also whether the brakes are properly equalized.

In view of the numerous accidents which occur by reason of defective brakes, State legislation has provided certain requirements with respect to the brakes of automobiles and ordinarily such regulations provide that the brakes must be of such efficiency as to stop the vehicle within a prescribed distance.

Often, inspectors hold up vehicles upon the roads and either themselves test the brakes or require the drivers to test the brakes, and if the brakes are found improper such inspectors require immediate adjustment of the brakes, or in serious instances frequently arrest the driver of the vehicle, and in many instances report the brake defects to the registry of vehicles which suspends or cancels the vehicle registration.

By reason of the present invention the operator is at all times advised of the condition of his brakes and if an inspector desires to ascertain whether the brakes of the automobile are working properly, immediate and accurate demonstration of the brake efficiency can be made.

Preferred embodiments of the invention are illustrated in the accompanying drawings, in which, Fig. 1 discloses a usual form of brake drum and co-operating external service brake with the mechanism for measuring the frictional resistance of the brake to the rotatable braking member applied thereto;

Fig. 2 is an enlarged detail view of a fluid-containing device which is subject to the force of frictional resistance of the applied brake and from which the pressure applied by the brake is transmitted to the indicating device;

Fig. 3 is a modified form of fluid-containing device;

Fig. 4 is a view illustrating a Bourdon tube adapted to be connected with the fluid-containing device and the means for transmitting the movement thereof to a rotatable indicator;

Fig. 5 is an illustration of a usual form of internal brake and the mechanism for actuating the same to which the invention has been applied;

Fig. 6 is a detail view of a segment of the dial, with which the indicator co-operates, graduated to indicate the number of feet within which the vehicle will be stopped by the brake as applied;

Fig. 7 is a view illustrating a plurality of Bourdon tubes and the mechanism for operating a plurality of indicators or pointers movable in opposite directions, the dial (not shown) obviously being so graduated as to indicate the force of resistance of the brake to rotation of the respective members to which they are applied;

Fig. 8 is a view of a panel provided with four indicating devices of the character above specified, one for each of the brakes of the four-wheel braking mechanism of a vehicle; and, Fig. 9 is a view partly in section and partly diagrammatical illustrating electrically operable mechanism for accomplishing the result above described.

The braking mechanism illustrated in Fig. 1 comprises the usual brake drum 1, which is connected to a wheel of the vehicle, and an external brake, such as a service brake comprising a band 2 enclosing the brake drum 1 and provided with brake shoes 3 and 4. The central portion of the band is secured to a bracket or yoke 5 which, instead of being connected to a rigid anchorage, is connected to one arm 6 of an L-shaped member, the other arm 7 of which is connected by a pivotal joint 8 to an arm 9, the upper end of which is connected to the movable wall 10 of a fluid-containing device 11, such as a sylphon bellows the opposite wall 12 of which is secured to a rigid anchorage 13 which may be in the form of a bracket secured to an adjacent rigid member of the vehicle.

A spiral spring 14, which is interposed between the heads 10 and 12 of the bellows, acts to return the bellows from partially collapsed to normal position. Desirably a spiral spring 15, which is connected to the lower end of the L-shaped member and to a rigid anchorage, acts in conjunction with the spring 14 to restore the L-shaped member to normal position upon release of the brake from the brake drum.

The free ends of the brake strap 2 and brake shoes 3 and 4 are secured respectively to brackets 16 and 17. A lever 18 is pivotally mounted upon the bracket 17 and the opposite free end of the lever 18 is pivotally connected to a rod 19 which extends to the brake pedal or brake lever as the case may be. A bolt 20, which is pivotally connected by a stud 21 to the lever 18, extends through the bracket 16 and a collar or washer 22 and is provided with a nut 23 which engages the washer. A spring 24, which surrounds the bolt 20, is interposed between the bracket 16 and the disk 25 which is adjustably supported upon a suitable nut 26 and lock nut 27 as in certain usual brake constructions.

In the operation of the device the depressing of the brake pedal or tool upon the brake lever draws the brake rod 19 forwardly, thereby rocking the lever 18 about its pivot upon the bracket 17 and acting through the bolt 20 to draw the free ends of the brake band and the brake shoes 4 toward each other, thereby clamping the brake shoes upon the drum with a force proportional to the pressure imposed upon the brake shoe or brake lever.

The frictional resistance produced by the brake thus applied to the drum tends to rotate the brake with the drum and consequently forces the L-shaped member upwardly, thereby imposing a pressure upon the fluid within the fluid-containing device 11. A pipe or conduit 28 communicates at its lower end with the chamber of the fluid-containing device and at its upper end with a Bourdon tube 29, the free end of which is connected by a link 30 to an arm 31 extending from the shaft 32 of a sector-shaped rack 33 the teeth 34 of which engage complementary teeth upon a gear 35 which is fixedly secured upon a shaft 36 which also has secured to it a pointer or indicator 37. A dial 38 is located in cooperative relation to the indicator 37. The dial 38 may be graduated in any suitable manner to indicate the force of frictional resistance exerted by the brake upon the rotatable drum. Preferably the graduations are such as to indicate with substantial accuracy the number of feet within which the vehicle will be stopped if the vehicle were travelling at the predetermined speed for which the indicator is calibrated, such, for example, as twenty-five miles per hour.

By virtue of this construction a measuring and indicating device is provided which may be located within the field of vision of the driver of the vehicle and which will enable him to observe the action of the brakes, such, for example, whether or not the brake shoe is dragging, and will also indicate with substantial accuracy the distance within which the vehicle will be stopped with any degree of pressure applied to the brake by the brake pedal or the brake lever. Thus the operator can gauge the amount of force required gradually to slow down the vehicle in traffic to a speed corresponding to that of a preceding vehicle, or upon full application of the brake will indicate with substantial accuracy the distance within which the vehicle would be stopped if the vehicle were traveling at the predetermined speed for which the indicating device is calibrated. By virtue of this construction brake tests can be made at any time upon the road either to enable the driver to know how his brake is working, or to demonstrate to a traffic officer the efficiency of the brake. An important feature of the present invention resides in the fact that upon application of the brakes, when the vehicle is travelling over any sort of road bed, the indicator will promptly show the distance within which the vehicle will be stopped upon that particular surface.

Fig. 3 illustrates a different form of fluid-containing device which comprises a cylindrical casing 39 having a fluid-containing chamber 40 and a piston 41 forming in effect the movable wall of the fluid-containing chamber. The piston rod 42 extends through a usual stuffing box 43 and is connected to the upper end of the L-shaped member 7. A pipe 44 leads from the fluid chamber 40 to the Bourdon tube 29 as aforesaid.

In either of these constructions the interposition of the fluid-containing device between the brake band and a rigid abutment constitutes a yieldable anchorage for the brake. The force of frictional resistance of the applied brake is transmitted to the Bourdon tube and the movement of the Bourdon tube actuates mechanism which visually indicates to the driver the force of frictional brake resistance.

The instrument may be calibrated and, as above stated, the dial graduated to indicate with substantial accuracy the distance within which the vehicle will be stopped by the force of the brake as applied at any time.

In Fig. 5 the invention is illustrated as applied to an internal brake. In this construction expansible brake shoes 45 and 46 having respectively brake linings 47 and 48 are diametrically oppositely disposed within the brake drum 1. The brake shoes 45 and 46 are provided at their lower ends with bosses 49 and 50 which engage a pin 51 which is slidably mounted in a slot 52 in the brake drum. A spring 53, connected to the pin 52, tends to maintain the pin in normal position at one end of the slot. The upper ends of the brake shoes 45 and 46 are also provided with bosses 54 and 55 presenting oppositely disposed flat surfaces which are actuated by a double face cam 56 which is secured to a shaft 57 having an arm 58 which is pivotally connected to a link 59 leading to the brake pedal or brake lever.

The pin 51 is pivotally connected to a rod 60, the opposite end of which is secured to the movable wall 10 of a fluid-containing device 11, the opposite wall of which is secured to an abutment or bracket 13 as heretofore described. A tube 29 communicating with the fluid-containing member 11 leads to the measuring and indicating device as above described.

This construction varies from that heretofore described merely in its application to an internal instead of an external type of brake.

It is found in practice that a device of this character which is applied to one of a pair of brakes can be properly calibrated to indicate with substantial accuracy the distance within which the vehicle will be stopped. However, similar measuring and indicating means may be applied to each of a pair of brakes so that the operator will be able to determine whether the brakes are properly equalized as well as to determine the distance within which the vehicle will be stopped when substantial equalization is shown. Such a device is illustrated in Fig. 7 in which the measuring and indicating device comprises two oppositely arranged Bourdon tubes 61 and 62 which communicate through pipes 63 and 64 with fluid-containing devices such as those previously described. These Bourdon tubes are connected at their ends respectively by links 65 and 66 with arms 67 and 68 upon the shafts of racks 69 and 70.

In this construction the rack 69 engages and actuates a gear 71 which is fixedly secured to a sleeve shaft 72 having upon it an indicator 73, while the rack 70 actuates a similar gear which is fixedly secured to the shaft 74 which is rotatably mounted within the sleeve shaft 72 and has secured to it an indicator 75.

In this construction the indicators when actuated by the pressure of fluid exerted by the respective brakes will move in opposite directions and the dial will therefore be graduated preferably from the vertical to the right and left to indicate the frictional force applied by the respective brakes, or the dial may be and preferably is graduated to indicate the number of feet within which the vehicle will be arrested. By suitable adjustment of the brake-equalizing mechanism these indicators should move to equal distances from the zero point of the scale.

Where it is desirable to have means for continuously observing the efficiency of each brake of a vehicle having four-wheel brakes, the fluid pressure device for each brake may be connected to an independent measuring and indicating mechanism such as above described. As illustrated in Fig. 8 tubes 76, 77, 78, and 79 communicate with the respective fluid-containing devices which are subject to the force of resistance of the respective brakes, and also communicate with Bourdon tubes or similar devices adapted to actuate the indicators 80, 81, 82, and 83 which co-operate with dials 84, 85, 86, and 87 as above described.

In Fig. 9 a modified form of the invention is illustrated in which suitable elastic material is employed to control the resistance of an electric current with suitable measuring and indicating devices to register the force of resistance of the brake, or the distance within which the vehicle may be stopped. In this construction the L-shaped members 6—7, which are connected to the brake strap, are pivotally connected to a rod 88 of a piston 89 which is reciprocably mounted in a cylinder 90 having an insulated lining 91. The cylinder encloses a carbon pile 92 the upper end of which is in contact with the conductor 93 having a stem 94 extending through suitable insulation 95 in the upper end of the cylinder. A current is supplied from a battery 96 and conductor 97 to the carbon pile and a conductor 98 from the stem 94 leads to an electric measuring device 99 similar to a milliammeter with a return conductor 100 leading from the measuring device to the battery. The dial of the electric indicating device 99 may be graduated to show with substantial accuracy the distance within which the vehicle will be stopped by the application of the brake and will also serve to indicate the condition and efficiency of the brake as heretofore described.

It will be understood that the particular embodiments of the invention disclosed herein are of an illustrative character and are not restrictive, and that various changes may be made in form, construction and arrangement of parts within the spirit and scope of the following claims.

Having thus described the invention, what is claimed as new, and desired to be secured by Letters Patent, is:

1. Efficiency indicating mechanism for the brakes of a moving vehicle having a rotatable brake member and a co-operating brake therefor, said brake being mounted for limited movement by and with said brake member, said mechanism comprising means for measuring the force of frictional resistance applied by said brake to the rotation of said rotatable member and including an indicator located within the field of vision of the vehicle driver, and means whereby said indicator is operatively connected to said first mentioned means.

2. Efficiency indicating mechanism for the braking mechanism of a moving vehicle having a rotatable brake member and a co-operating brake, and means for applying the same, said brake being adapted for limited movement by and with said rotatable brake member, a yieldable anchorage for said brake to resist such movement, means operable by the force acting upon said yieldable anchorage during the movement of the vehicle at any speed including an indicator mounted upon the vehicle within the field of vision of the vehicle driver and graduated to indicate with substantial accuracy the distance within which the vehicle would be stopped if it were travelling at a predetermined speed.

3. Efficiency indicating mechanism for the braking mechanism of a moving vehicle having a rotatable brake member, a co-operating brake and means for applying the same, said brake being adapted for limited movement by and with said rotatable brake member, a yieldable anchorage for said brake to resist such movement including an elastic medium subject to the force of the applied brake on said anchorage during the movement of the vehicle at any speed, and means operable by the force transmitted by said elastic medium to measure and indicate the force of frictional resistance of said brake to the rotation of said rotatable brake member, said last means being located within the field of vision of the vehicle driver, and graduated to indicate with substantial accuracy, the distance within which the vehicle would be stopped if it were traveling at a predetermined speed.

4. Efficiency indicating mechanism for the braking mechanism of a moving vehicle having a rotatable brake member, a co-operating brake and means for applying the same, said brake being adapted for limited movement by and with said rotatable brake member, a yieldable anchorage for said brake to resist such movement including an elastic medium subject to the force of the applied brake on said anchorage, during the movement of the vehicle at any speed, and means including an indicator mounted upon the vehicle and located within the field of vision of the vehicle driver operable by the force applied to said elastic medium to indicate with substantial accuracy the distance within which the vehicle would be stopped were it travelling at a predetermined speed.

5. Efficiency indicating mechanism for the braking mechanism of a moving vehicle having a rotatable brake member, a co-operating brake and means for applying the same, said brake being adapted for limited movement by and with said rotatable brake member, a yieldable anchorage for said brake including a fluid-containing device having a rigidly anchored wall and a relatively movable wall connected to said brake, and a fluid-actuated indicating device communicating with said fluid-containing device mounted upon said vehicle and located within the field of vision of the vehicle driver and operable to indicate with substantial accuracy the distance within which the vehicle would be stopped by the applied brake were it travelling at a predetermined speed.

6. Efficiency indicating mechanism for the braking mechanism of a moving vehicle having a rotatable brake drum, a co-operating brake and means for applying the same to said drum, said brake being adapted for limited movement by and with said rotatable brake drum, means including a fluid-containing device having a rigidly anchored wall and a relatively movable wall connected to said brake, a fluid-actuated indicating device communicating with said fluid-containing device, mounted upon said vehicle, and located within the field of vision of the vehicle driver, said indicating device comprising a Bourdon tube, a rotatable indicator, rack and pinion connections between said indicator and said Bourdon tube, and a dial co-operating with said indicator and graduated to indicate with substantial accuracy the distance within which the vehicle would be stopped by the force of frictional resistance applied to the brake drum were the vehicle travelling at a predetermined speed.

7. Efficiency indicating mechanism for the braking mechanism of a moving vehicle having a plurality of rotatable brake drums and co-operating brakes, said brakes being adapted respectively for limited movement by and with the respective rotatable brake drums, means located within the field of vision of the vehicle driver and means whereby said first means is rendered operable by said yielding movement of the respective brakes during the movement of the vehicle at any speed to measure and indicate the force of frictional resistance of the respective brakes to their co-operating brake drums.

8. Efficiency indicating mechanism for the braking mechanism of a moving vehicle having a plurality of rotatable brake drums and co-operating brakes, said brakes being adapted respectively for limited movement by and with the respective rotatable brake drums, means located within the field of vision of the vehicle driver and means whereby said first means is rendered operable by the yielding movement of the respective brakes during the movement of the vehicle at any speed to measure and indicate the frictional resistance of the respective brakes and when showing substantial equalization of the brakes to indicate with substantial accuracy the distance within which the vehicle would be stopped by the applied brakes were the vehicle travelling at a predetermined speed.

9. In combination, with a vehicle having a brake drum, a brake shoe, and means for applying the shoe upon the drum, means for yieldingly resisting the turning movement of the brake shoe with the drum, an indicator, and means carried by the brake shoe and connected with said indicator and rendered operative by the movement of the brake shoe with said drum, for indicating the resistance of the brake shoe with respect to the drum.

10. A vehicle brake comprising, in combination, a rotatable brake drum, a non-rotatable support carried by the vehicle, a brake shoe mounted for circumferential movement on said support, means for bringing said shoe into frictional engagement with said drum, a yieldable abutment mounted on said support, means for transmitting the circumferential movement of said shoe proportionally to said abutment, said abutment resisting said circumferential movement, and means carried by the vehicle and connected with said abutment for indicating the yield of said abutment.

11. A vehicle brake comprising, in combination, a rotatable member, a braking member, means for bringing said members into frictional engagement, a yieldable abutment opposing movement of said braking member with said rotatable member, and means carried by the vehicle remote from said abutment and connected therewith for indicating the yield thereof by movement of said braking member with said rotatable member.

12. In a brake testing attachment for motor vehicles, the combination with a brake drum, a brake shoe and a fixed element with relation to which said brake shoe is movable a limited extent when said brake shoe is engaged with said drum, and means for yieldably resisting movement of said brake shoe, of means carried by the vehicle and associated with said fixed element and said shoe for indicating the extent of movement of said brake shoe under the urge of said drum when said brake shoe is engaged with said drum.

ARCHIBALD D. GULLIVER.